(12) United States Patent
Cornaby et al.

(10) Patent No.: US 9,451,406 B2
(45) Date of Patent: Sep. 20, 2016

(54) BEACON METHODS AND ARRANGEMENTS

(71) Applicant: Digimarc Corporation, Beaverton, OR (US)

(72) Inventors: Colin P. Cornaby, Portland, OR (US); Tony F. Rodriguez, Portland, OR (US); Nikolaus Stuecklen, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/739,251

(22) Filed: Jun. 15, 2015

(65) Prior Publication Data

US 2016/0044460 A1 Feb. 11, 2016

Related U.S. Application Data

(60) Provisional application No. 62/012,239, filed on Jun. 13, 2014.

(51) Int. Cl.

| | |
|---|---|
| *H04W 24/00* | (2009.01) |
| *H04W 4/02* | (2009.01) |
| *H04W 40/24* | (2009.01) |
| *H04L 5/00* | (2006.01) |
| *H04W 52/02* | (2009.01) |
| *G06T 1/00* | (2006.01) |
| *H04W 12/02* | (2009.01) |

(52) U.S. Cl.
CPC ............ *H04W 4/023* (2013.01); *G06T 1/0092* (2013.01); *H04L 5/0044* (2013.01); *H04W 40/244* (2013.01); *H04W 52/0209* (2013.01); *H04W 12/02* (2013.01)

(58) Field of Classification Search
CPC ............ H04W 4/023; H04W 40/244; H04W 52/0209; H04W 12/02; G06T 1/0092; H04L 5/0044
USPC .................... 455/456.6; 370/252; 705/14.26; 381/315; 725/19
See application file for complete search history.

(56) References Cited

U.S. PATENT DOCUMENTS

| | | | | |
|---|---|---|---|---|
| 8,363,561 | B2 * | 1/2013 | Hayashino | H04W 72/082 370/252 |
| 8,705,782 | B2 * | 4/2014 | Woods | H04R 25/558 381/315 |
| 2014/0026159 | A1 * | 1/2014 | Cuttner | G06Q 30/0241 725/19 |
| 2015/0023537 | A1 * | 1/2015 | Woods | H04R 25/558 381/315 |
| 2015/0254704 | A1 * | 9/2015 | Kothe | G06Q 30/02 705/14.26 |
| 2015/0341890 | A1 * | 11/2015 | Corbellini | H04W 64/00 455/456.6 |

* cited by examiner

*Primary Examiner* — Amancio Gonzalez
(74) *Attorney, Agent, or Firm* — Digimarc Corporation

(57) ABSTRACT

Wireless beacons, such as short range Bluetooth beacons, are combined with other technologies—including audio and image recognition technologies (e.g., fingerprint- or digital watermark-based)—to provide a variety of enhanced capabilities and services.

11 Claims, No Drawings

BEACON METHODS AND ARRANGEMENTS

RELATED APPLICATION DATA

This application claims priority to provisional application 62/012,239, filed Jun. 13, 2014, the disclosure of which is incorporated herein by reference.

BACKGROUND AND INTRODUCTION

The present technology concerns beacons, and related improvements. One type of popular beacon is termed BLE, for Bluetooth Low Energy (also sometimes known as Bluetooth Smart). These devices are small, battery powered devices that emit a low power (e.g., 10 mw or less, sometimes 1 mw or less) signal in the 2.4-2.485 GHz ISM frequency band. The signal typically conveys a plural-bit identifier, which is established by data stored in a memory of the beacon. In some devices, the memory is rewriteable. Some beacons also include sensors (e.g., accelerometer and temperature sensors), and data from the sensor(s) is among the information encoded in the transmitted signal.

In many applications, after a consumer device senses the beacon's plural bit identifier, it consults a data structure (e.g., a table or database) to obtain associated information or metadata, such as what action should be taken in response to detection of that beacon. This data structure may be part of the consumer device, or it may be remote, e.g., the identifier may be sent to a remote server, and the associated information is then returned to the consumer device from the server.

BLE technology was originally developed by Nokia, and marketed under the name Wibree. Its technical details are familiar to artisans and are reviewed, e.g., in the Wikipedia article for "Bluetooth Low Energy" and in Honkanen, et al, "Low End Extension for Bluetooth," IEEE Radio and Wireless Conference, 2004. The current standard governing the technology is the Bluetooth 4.2 Specification (available from the Bluetooth Special Interest Group body; the core of the spec is available at the https web site www<dot>Bluetooth<dot>org/en-us/specification/adopted-specifications/Core_v4.2.pdf.)

BLE hardware is available from various suppliers, including Gimbal, Inc. and Estimote, Inc.

Many consumer devices support BLE interaction, including Apple's iPhone, iPad, iPod devices running iOS7 or later. A number of applications for BLE have been proposed or implemented. These include:

Offering short-duration discounts and other incentives to nearby shoppers and other visitors.
Providing information and reviews about products on a given store shelf.
Providing directional guidance, e.g., to seats in a sports stadium, or to exhibits in a museum.
Personalized product recommendations, e.g., based on shopper history.
Access to digital magazines newspapers and magazines in doctor offices and other waiting areas.
Automated mobile tour guides in museums and other places.
Control of home automation based on user presence.
Toys that can react to location and other nearby toys.
Alerting commuters at a bus station that their bus has arrived.
Geofencing applications.

Additional prior art information on beacon technology, including certain related applications, is detailed in Apple's patent publications, including U.S. Pat. No. 8,718,620, 20090215398, 20100198626, 20120117274, 20130078979, 20130203445, and 20140019367.

DETAILED DESCRIPTION

In one aspect, the present technology involves activating a digital watermark detector only when a beacon signal (or a particular beacon signal) is detected. Such an arrangement spares battery life (i.e., the watermark detector is not run at other times), and spares the user the need to manually activate the detector—it is done based on proximity to a particular beacon. When the watermark detector is activated, it can provide information and other responses to the user, as detailed in patent documents identified below.

For example, a beacon may be placed in a produce aisle of the supermarket, and may serve to activate an audio watermark detector that extracts a watermark payload from background music. The watermark detector is thus only active when a shopper is positioned within range of that beacon. A beacon in the frozen foods section, in contrast, may not have this watermark detector-activation functionality.

In accordance with another aspect, information received via a beacon signal, and information received via a watermark in audio or image content, are used in combination. For example, a user's smartphone may decode watermark data encoded in the artwork of retail product packaging, and can trigger associated functionality. The beacon signal can cause different functionality to be triggered, depending on which beacon is nearby (or whether any beacon is nearby). If a shopper captures imagery from a bottle of aspirin while in the pharmacy section of a store, one response may be triggered (e.g., presentation of warnings about adverse drug interactions and contraindications). If the shopper captures such imagery while away from the pharmacy section (e.g., at a checkout station), a different response may be triggered (e.g., information about pricing). If the user is at home (i.e., near no beacon), still a different response may be triggered.

As is familiar, beacons needn't be fixedly mounted on structures—such as shelves and walls; they may be conveyed by people—including shoppers and store personnel. If a shopper captures imagery of an aspirin bottle when a pharmacist is within ten feet, the adverse drug interaction/contraindication information may be presented (so that the user can pose any follow-up questions to the nearby pharmacist). If no pharmacy professional is nearby, different information may be presented in response to detection of the watermark payload from the aspirin package artwork.

In our digitally-dominated culture, some users become annoyed at the number of alerts and "push" notifications that vie for our attention. In accordance with another aspect of the technology, such distractions are moderated by reliance on stored rule data that specifies the conditions/context under which an interruption is warranted. Input provided by the user can be employed in crafting these rules. (Such rules can be stored in any system component, including in a handset, in a beacon, or in a remote server.)

In one such embodiment, a Boolean language arrangement is employed to define the rules. A rule may be textually-entered as a conditional expression employing various bit-wise operations including AND, OR and NOT operators. If the rule is evaluated and found to be true, a response (which may be specified or determined by the rule) is issued. There may be hierarchies of rules, e.g., evaluation of a first such rule may occur only when a governing second rule is met. One of these first or second rules may be authored (or selected) by the user, e.g., don't disturb me when I'm paused at the seafood counter unless offering to save me a dollar or more. Other of the rules may be authored by the store personnel.

In another embodiment, rule data is not entered textually; rather, it is entered by selections made in a graphical user interface (GUI). The GUI may include a map layout of a store, and allow a person to tap a region to identify one or more beacons to listen for. Other features in the GUI can be selected to choose further conditions that should be included in the rule. Still another feature in the GUI can be selected to identify the desired action that should be taken when the rule is found to be true.

As in the examples noted elsewhere, the rules and responses needn't depend simply on detection of beacon signals. Other signals (e.g., audio or image watermarks, etc.) and context information can also be employed. Moreover, all signals are potentially additive or subtractive with each other, and all signals can potentially be evaluated in varying order, with multiple dependencies, as well as multiple Boolean/bit-wise results.

For security or other reasons, information transmitted from a beacon (or associated information returned from a data store, based on the beacon information) sometimes is encrypted, and must be decrypted before use. Similarly with the information conveyed in a digital watermark payload (or with associated information returned from a data store, based on submitted watermark payload information). In accordance with a further aspect of the technology, key data needed to decrypt the beacon-related data can be conveyed via the digital watermark signal. (Or, conversely, key data needed to decrypt the watermark-related data can be conveyed via the beacon signal.)

Another security construct sometimes employed with beacons is rolling codes. That is, the payload transmitted by the beacon is not fixed forever. Rather, it is occasionally changed. Often, the change is dictated by a numerical sequence. The rolling of the beacon code to its next state in the sequence may be triggered by passage of time (e.g., every seven days), or it may be triggered in response to another signal.

If such a beacon code is encrypted, a watermark payload that provides the needed decryption key can be updated on the same schedule.

Consider a beacon at a checkout station of a supermarket (either fixed there, or worn by a cashier). When detected by a shopper's smartphone, the check-out beacon may trigger the phone to launch application software that presents payment credentials (e.g., credit card info). To guard against mis-use of such technology, the beacon code may be rolled to a next state every ten minutes. Decryption and use of the checkout beacon functionality depends on the co-presence of an audio watermark signal that conveys the needed decryption key. An audio soundtrack (e.g., background music) conveying the needed key is played only through speakers of the store sound system in the checkout station region.

In a related embodiment, a smartphone doesn't respond to a beacon signal (e.g., one received at a checkout station, which normally triggers presentation of payment app software on the smartphone screen) unless it also detects a particular watermark payload from media content. In a variant embodiment, detection of a particular watermark payload indicates—to the smartphone—that a beacon signal should be ignored (rather than heeded).

In other arrangements, a watermark signal can serve to re-define the payload sent by a beacon. The watermark payload can convey data that replaces some or all of the data in the beacon's payload memory. Alternatively, receipt of a particular watermark payload can simply trigger a rolling of the beacon payload to a next state in a sequence.

In one particular arrangement, the watermark signal is conveyed in an audio signal. The beacon apparatus is equipped with a microphone, and a watermark decoder (e.g., as detailed in pending application PCT/US 14/72397, filed Dec. 24, 2014).

In a further particular embodiment, the beacon is audio watermark-addressable. That is, it does not respond to all watermark signals. Rather, it decodes the watermark payload, and checks to see if the decoded payload designates that particular beacon as one to which it is targeted. (For example, one field of the watermark payload—such as the first twelve bits—can be checked against an identification number associated with the beacon—such as its last twelve bits. If the fields match, or otherwise correspond, the beacon apparatus updates its memory in response to the decoded watermark.)

Some beacons segment their payloads into different fields, such as a UUID, a Major ID, and a Minor ID. Smartphones can be configured to respond to only beacons with certain IDs (e.g., a certain Minor ID). A watermark signal can convey, to a smartphone, the Minor ID(s) of the beacon(s) for which it should listen to which it should respond (e.g., triggering an action). The watermark information thus serves to provide "white list" data about relevant beacons, so that others can be ignored. (Conversely, a "black list" can similarly be defined.)

Alternatively, the ID(s) to which a smartphone should respond may be provided otherwise. For example, if a shopper enters a store with a shopping list identifying Kraft parmesan cheese and Budweiser beer, the smartphone software can query a data structure (e.g., at the store) to learn the ID(s) of beacons at those locations in the store, or of beacons that trigger coupons for those products. The smartphone thereafter listens just for those beacons—ignoring others.

Different branches of the same store (e.g. Walmart) may code all their beacons positioned next to peanut butter with one particular identifier, and may code all their beacons positioned next to ketchup with another identifier. Responses to these identically-coded beacons between the stores can be differentiated by different watermark signals encoded in the different stores' background audio. (E.g., if one store has a surplus of Jif peanut butter, the watermark signal in that store can serve to trigger presentation of a coupon for Jif peanut butter, when the signal from the adjoining beacon is sensed.)

Watermarks can also be used in challenge-response systems employing beacons. For example, a smartphone may receive a beacon signal, hash the received beacon payload, and transmit it to a server—thereby confirming a person's presence at a particular location. (In another such arrangement, the user's smartphone encrypts the received beacon payload with the user's private key. The resulting data is sent to the server, which decrypts the data with the user's public key—again confirming presence of the person at a particular location.)

To increase the security of such systems, and deter spoofing, the response to the challenge (i.e., to the received beacon signal) can also be made to depend on watermark information available at the same location at the same location (e.g., via the then-playing audio sound track).

In accordance with another aspect of the present technology, watermark-related functionality (e.g., as detailed herein) is provided in a common set of software (e.g., software development kit) with software used in smartphones to respond to beacon data. In addition to the functionality commonly performed by watermark SDKs and beacon SDKs, alone, such a hybrid set of software supports the hybrid functionality involving both watermark and beacon signals, detailed herein.

Concluding Remarks

Having described and illustrated principles of our inventive work with reference to illustrative examples, it will be recognized that the technology is not so limited.

For example, while the present application focuses on Bluetooth Low Energy (BLE) beacons, the same principles are applicable with other location-indicating technologies. These include GPS, NFC, etc. (BLE is preferred in many situations because it works indoors, and its minimum range—from 10 meters up to about 50 or 100 meters—is much greater than NFC.)

While many of the detailed arrangements combine watermarking and beacon technologies, in other applications biometrics (e.g., skin fingerprint, facial recognition, speaker recognition, etc.,) can be employed. For example, access to a particular area or service can be restricted until an expected confluence between a particular biofingerprint and a particular Bluetooth signal (e.g., emitted from a particular user's phone) is detected.

Although the watermark focus of the above-detailed technology has been on watermark data conveyed by audio, it should be recognized that the same principles can be applied to watermark data conveyed by imagery (e.g., captured from product packaging, store signage, print advertising, point of sale electronic displays, etc.). Likewise, arrangements described in connection with imagery can be practiced with audio.

To date, beacons have emitted just at radio frequencies. In some embodiments, the beacon apparatus can include an audio transducer (e.g., piezoelectric emitter) that issues not just a radio signal, but also an audio signal (which may be ultrasonic) when it is activated (e.g., is in communication with a smartphone), or when one or more sensors (which may form part of the beacon apparatus, or may be separate—as in a user's phone) signal certain conditions. The emitted audio signal may, itself, be watermarked. (The payload of the watermark may be, but need not be, the payload of the beacon, or a derivative thereof.)

Relatedly, the physical housing of the beacon apparatus can be textured, printed, or otherwise marked to convey machine readable data, such as a QR code or digital watermark pattern.

It is expected that consumer packaged goods soon will be serialized. That is, it will be possible to digitally distinguish one box of Wheaties from a seemingly-identical box. (Patent publication 20150016664 details one such arrangement—employing plural watermarks in tiled arrangement—with the spatial relationship between the tiles varying from box to box as a consequence of the printing process. RFID chips—sometimes termed NFC chips—can also allow such functionality to be achieved, albeit at a significantly greater cost.) By such arrangements, the response provided to a user can depend not just on the type of package, and the location at which the consumer encounters the package, but also which particular instance of the package is encountered.

While the above-described arrangements contemplate that app software on a smartphone performs certain of the detailed functionality, in other embodiments these functions can naturally be performed otherwise—including by operating system software on a smartphone, by a server at a social networking service, by another smartphone or computer device, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 6; smartphones following Google's Android specification (e.g., the Galaxy S6 phone, manufactured by Samsung, and the Google Moto X phone, made by Motorola), and Windows 10 mobile phones (e.g., the Nokia Lumia 1520).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4; the latter includes an ARM CPU, a GPU, and nVidia's Chimera computational photography architecture). Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, and field programmable gate arrays (e.g., the Xilinx Virtex series devices). Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

To realize such an implementation, the relevant module(s) (e.g., watermark decoding) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion, e.g., decoding a watermark payload from captured audio or imagery, querying databases, etc. However, because the resulting circuit is typically not changeable, such implementation is best used for component functions that are unlikely to be revised.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of audio, image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv:1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to copending patent application 61/861,931, filed Aug. 2, 2013.

Applicant's patent documents 20110212717 and 20110161076 detail intuitive computing systems, e.g., that are responsive to context information. In a reference platform architecture detailed in these documents, a variety of sensors feed sensed information to a common data structure, from which plural recognition agents draw data for their own operation (in some instances returning result information to the common data structure). Information from BLE beacons can be among this information.

Various references have been made to context. The artisan will understand that context refers to any information useful in characterizing the situation of an entity (an entity being a person, place or object that is considered relevant to an interaction between a user and an application, including the user and application themselves)—not just location.

Context information can be of many other sorts, including computing context (network connectivity, resource availability, processor type, CPU contention, etc.), user context (user profile, actions, preferences, nearby friends and other people, social network(s) and situation, etc.), physical context (e.g., lighting, noise level, traffic, sensed sounds, recognized speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then user or device actions (e.g., writing, talking, reading, searching, navigating, pointing), then proximities (e.g., to people, vehicles, buildings, perimeters, jurisdictions, other devices), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

While many of the illustrative embodiments made reference to digital watermarking, fingerprint-based media identification (i.e., recognition of inherent, rather than added, patterns) can generally be substituted.

The techniques of digital watermarking are presumed to be familiar to the artisan. Examples are detailed, e.g., in Digimarc's patent documents U.S. Pat. Nos. 6,614,914, 6,590,996, 6,122,403, 20100150434, 20110274310, and 20140108020, and in pending applications Ser. No. 14/724,729, filed May 28, 2015, and Ser. No. 14/725,399, filed May 29, 2015 (as well as in patent documents cited in other parts of this disclosure). Such watermarks are commonly imperceptible, meaning they are not noticeable to a viewer examining watermarked packaging from a typical viewing distance (e.g., 20 inches), or listening to a background soundtrack in a retail environment. Spot colors, as are sometimes found on packaging, can be watermarked by leaving tiny voids in the printing to subtly change the luminance or chrominance. Other techniques for watermarking of spot colors are detailed in patent U.S. Pat. No. 6,763,124 and application Ser. No. 13/975,919, filed Aug. 26, 2013.

Fingerprint-based content identification techniques are also well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.) Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Use of such identification technologies to obtain object-related metadata is familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's patents U.S. Pat. No. 6,947,571 and U.S. Pat. No. 7,206,820.

Applicant's other work that is relevant to the present technology includes that detailed in pending patent application Ser. No. 14/562,584, filed Dec. 5, 2014, and in published applications 20100228632, 20120214515, 20120284012, 20130097630, 20130311329, 20140052555, 20140106710, 20140119593, 20140164124, 20140244514, and 20140357312.

Different of the described functionality can be implemented on different devices. For example, in a system in which a smartphone communicates with a computer at a remote location, different tasks can be performed exclusively by one device or the other, or execution can be distributed between the devices. Extraction of fingerprint and watermark information from imagery or audio is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The artisan is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A wireless beacon comprising:
    a memory storing beacon payload data;
    a transmitter for transmitting a signal in the 2.4-2.485 GHz band that conveys the beacon payload data;
    a microphone;
    a watermark detection system that operates on audio sensed by the microphone;
    a processor for determining, from data output by the watermark detection system, whether the audio targets the wireless beacon, and the processor is for changing the stored beacon payload data in response to such a determination, and in which the processor is also for handling addressable payload updates from an audio soundtrack of background music in a retail store.

2. The wireless beacon of claim 1 in which the processor is also for rolling the beacon payload data from one value to a next value in response to such the determination.

3. The wireless beacon of claim 1 in which the processor is also for replacing the beacon payload data in the memory with a replacement payload data based on the data output by the watermark detection system.

4. A smartphone system for operation by a user, including:
    a battery;
    a media sensor system comprising a microphone and a camera;
    a watermark detection system selectively activated for extracting watermark payload data from visual or audio media content sensed by the media sensor system;
    a wireless beacon sensor operative for extracting beacon payload data from beacon radio signals transmitted in the 2.4-2.485 GHz band; and
    a processor for adapting operation of the smartphone system based on beacon payload data output data from the wireless beacon sensor, wherein said processor is for causing, by stored configuration data, the watermark detection system to: (i) activate and extract first watermark payload data from first media content, and present to the user first auxiliary data in response to said first watermark payload data, when the wireless beacon sensor outputs payload data transmitted from a first beacon, but not when the wireless beacon sensor outputs payload data transmitted from a second beacon, nor when the wireless beacon sensor outputs no payload data;
    in which the watermark detection system is selectively activated in accordance with detected beacon signals, thereby conserving power of said battery by not being always active.

5. The smartphone system of claim 4 in which said processor is for causing, by said stored configuration data, the watermark detection signal to (ii) activate and extract said first watermark payload data from said first media content, and present to the user second auxiliary data in response to said first watermark payload data, when the wireless beacon sensor outputs payload data transmitted from a second beacon different than the first beacon.

6. The smartphone system of claim 5 in which said processor is for causing, by said stored configuration data, the watermark detection system to (ii) be inactive, and not extract first watermark payload data from said first media content, nor present to the user the first or second auxiliary data, when the wireless beacon sensor outputs payload data transmitted from a third beacon.

7. The smartphone system of claim 5 in which the stored configuration data defines logical expressions indicating which response the watermark detection system should perform based on payload data output by the beacon sensor.

8. The smartphone system of claim 5 including said second beacon, wherein said second beacon is conveyed by a person, rather than fixedly-mounted.

9. The smartphone system of claim 5 in which the processor is for employing said first watermark payload data as a cryptographic key in a secure transaction when the wireless beacon sensor outputs payload data transmitted from said second beacon.

10. The smartphone system of claim 4 in which said processor is for causing, by said stored configuration data, the watermark detection system to (iii) be inactive, and not extract first watermark payload data from said first media content, nor present to the user the first or second auxiliary data, when the wireless beacon sensor outputs payload data transmitted from a third beacon.

11. A smartphone system, including:
    a media sensor system comprising a microphone and a camera;
    a watermark detection system selectively operable for extracting watermark payload data from visual or audio media content sensed by the media sensor system;
    a wireless beacon sensor operative to extract beacon payload data from beacon radio signals transmitted in the 2.4-2.485 GHz band;

a memory identifying plural physical items stocked for sale in a retail store; and a processor for adapting operation of the smartphone system based on said plural physical items identified in the memory, the processor for querying a remote data store for beacon IDs corresponding to said plural physical items, and for responding to said beacon IDs and ignoring others.

\* \* \* \* \*